United States Patent [19]

Thai et al.

[11] Patent Number: 4,617,330

[45] Date of Patent: Oct. 14, 1986

[54] EPOXY RESIN COMPOSITION FOR CAST MOLDING

[75] Inventors: Cao M. Thai; Takayuki Oguni, both of Yokohama; Kazuhiko Kurematsu, Atsugi; Tsuguo Kato, Fujisawa, all of Japan

[73] Assignee: Kabushiki Kaisha Toshiba, Kawasaki, Japan

[21] Appl. No.: 717,111

[22] Filed: Mar. 28, 1985

[30] Foreign Application Priority Data

Mar. 30, 1984 [JP] Japan .................................. 59-61211
Sep. 28, 1984 [JP] Japan ................................ 59-201964

[51] Int. Cl.$^4$ .......................... C08K 7/10; C08K 7/14; C08L 63/00
[52] U.S. Cl. .................................. 523/220; 523/443; 523/444
[58] Field of Search ........................ 523/220, 443, 444

[56] References Cited

U.S. PATENT DOCUMENTS

| | | | |
|---|---|---|---|
| 4,128,527 | 12/1978 | Kinjo et al. | 523/220 |
| 4,145,369 | 3/1979 | Hira et al. | 523/220 |
| 4,168,259 | 9/1979 | Coleman | 260/40 |
| 4,312,795 | 1/1982 | Taguchi et al. | 523/220 |
| 4,455,398 | 6/1984 | Budich et al. | 523/220 |
| 4,474,921 | 9/1984 | Dix | 524/423 |

FOREIGN PATENT DOCUMENTS

| | | | |
|---|---|---|---|
| 2360555 | 9/1974 | Fed. Rep. of Germany . | |
| 2611974 | 9/1977 | Fed. Rep. of Germany | 523/220 |
| 2836057 | 3/1980 | Fed. Rep. of Germany . | |
| 0084510 | 5/1982 | Japan | 523/220 |
| 0168619 | 10/1983 | Japan | 523/220 |
| 0206640 | 12/1983 | Japan | 523/220 |
| 0206641 | 12/1983 | Japan | 523/220 |

OTHER PUBLICATIONS

How to Test and Improve Thermal Shock Resistance of Epoxies, Insulation/Circuits, May (1973), pp. 33-38.
The Handbook of Electric Insulating Material (Nikkan Kogyo Shinbunsha 1965), European Search Report.

*Primary Examiner*—Herbert J. Lilling
*Attorney, Agent, or Firm*—Schwartz, Jeffery, Schwaab, Mack, Blumenthal & Evans

[57] ABSTRACT

An epoxy resin composition for cast molding which comprises:
(A) an epoxy resin;
(B) a curing agent;
(C) cut fibers having distributions of 3 to 20 μm in diameter and 3 to 1500 μm in length;
(D) inorganic powder having a size distribution of particles with 90% by weight or more of particles with particle sizes of 10 μm or less and 50% by weight or more of particles with particle sizes of 5 μm or less, the total amount of the components (C) and (D) formulated being 40 to 225 parts by volume per 100 parts by volume of the total amount of the components (A) and (B) formulated displays excellent crack resistance, strength as well as a low shrinkage characteristic and, good fluidity.

9 Claims, 3 Drawing Figures

EPOXY RESIN COMPOSITION FOR CAST MOLDING

BACKGROUND OF THE INVENTION

This invention relates to an epoxy resin composition for cast molding, more particularly to an epoxy resin composition which is excellent in crack resistance, strength and low shrinkage of the cured product, and also good in fluidity.

Attention has been directed recently to epoxy resin compositions for good strength in cured products with little shrinkage during casting, and such compositions have widely been used as castings or moldings. For making casting operation easier, epoxy resins with low viscosity are demanded.

It has been well known in the art that low shrinkage, crack resistance and strength of the cured products can be improved by formulation of fibrous fillers in molding materials or casting materials. Generally speaking, these characteristics can be improved in proportion to the amount of the fibers formulated, but the viscosity of the composition will be increased as a consequence. In particular, fluidity of a casting material will extremely be lowered until it cannot be poured into a mold. For this reason, the amount of the fibers is extremely limited, and the effect of addition cannot entirely be expected.

Accordingly, as the result of studies and developments progressed about the resin having at the same time the strength and low viscosity of the materials in the field of plastics, the following proposal has been made.

In the field of thermoplastic resins, for making better the supplying characteristic during molding, a resin in which fibers with further shorter fiber lengths than chopped strand conventionally used are formulated has been known. However, the feeding characteristic indicates the feeding characteristic from a hopper during injection molding and it is entirely different from the concept of fluidity of a cast molding material. Also, Japanese Provisional Patent Application No. 168619/1983 discloses that "cut glass fibers have the function of improving flowing characteristic of rubbery polymer with high viscosity during heat curing to give good results to sealability and workability, and also prevents generation of bubbles at the adhereing interface, thereby functioning effectively for disapparance of the defects for causing peel-off of the coated film".

However, the supplying characteristic and fluidity mean the flowing characteristic of the material when it flows under pressure during compression molding, injection molding, RIM molding, etc., but not the flowing characteristic of the material which flows naturally under gravity in cast molding. Further, according to the experiments by the present inventors, it has been found that, even when an epoxy resin is formulated with cut glass fibers alone, the viscosity of the composition will be markedly elevated in proportion to the amount of said fibers formulated. Thus, the improved effect of the fluidity described in the above Patent Publication does not appear to be due to the cut glass fibers alone, but it seems to be exhibited by the combination of the glass fibers with the curing agent. However, the improved effect of fluidity by such a combination is very weak and the cut glass fibers, although having very short fiber lengths, are still fibrous, causing a considerable increase in viscosity even when added in a small amount, and therefore the above composition cannot be expected to be useful as a conventional cast molding material.

Accordingly, in this field of the art, it has been earnestly desired to have an epoxy resin composition for cast molding containing a large amount of fibers and also having a low viscosity, while attempting to improve workability during cast molding operation.

SUMMARY OF THE INVENTION

An object of this invention is to provide an epoxy resin for cast molding which will not bring about increase in viscosity even when formulated with a large amount of fibrous fillers, and yet can give a cured product excellent in crack resistance, strength and low shrinkage.

The present inventors have made studies intensively, in view of the state of the art as described above, and consequently found that the viscosity of a composition can be lowered dramatically when used with addition of cut fibers having specific shapes and powder with specific particle size distribution to the epoxy resin, to accomplish this invention. That is, this invention enables use of fibers which could not be used in the prior art for cast molding materials by utilizing a novel phenomenon that viscosity is lowered by combined use of two fillers which will individually bring about increase in viscosity, and was consequently successful in developing an epoxy resin composition for cast molding which can satisfy at the same time strength, crack resistance, low shrinkage and workability.

More specifically, the epoxy resin composition for cast molding of this invention comprises:
(A) an epoxy resin;
(B) a curing agent;
(C) cut fibers having distributions of 3 to 20 $\mu$m in diameter and 3 to 1500 $\mu$m in length;
(D) inorganic powder having a size distribution of particles with 90% by weight or more of particles with particle sizes of 10 $\mu$m or less and 50% by weight or more of particles with particle sizes of 5 $\mu$m or less, the total amount of the components (C) and (D) formulated being 40 to 225 parts by volume per 100 parts by volume of the total amount of the components (A) and (B) formulated.

In this invention, the composition may further contain:
(E) inorganic powder having size distribution of particles with 90% by weight or more of particles with sizes of 50 $\mu$m or less and more than 10% by weight of particles with sizes of 10 $\mu$m or more, said inorganic powder (E) being contained in an amount satisfying the following ranges per 100 parts by volume of the total amount of the components (A) and (B) formulated:
40 parts by volume $\leq$ (C)+(D)+(E) $\leq$ 225 parts by volume; and
10 parts by volume $\leq$ (E) $\leq$ 75 parts by volume.

DESCRIPTION OF THE PREFERRED EMBODIMENTS

The present invention is to be described in more detail below.

The epoxy resin of the component (A) to be used in this invention may be any of those conventionally known as epoxy resins. Typical examples of this resin may include bisphenol A diglycidyl ether and its dimer, trimer, epoxy resins obtained from novolac type phenol resin and epichlorohydrin, epoxy resins obtained from polyhydric alcohols or polyalkylene oxide and epichlorohydrin, epoxy resins containing cyclohexene oxide groups and the like.

The curing agent of the component (B) to be used in this invention may be any of those conventionally known as curing agents. Typical examples of this curing agent may include acid anhydrides such as phthalic anhydride, hexahydrophthalic anhydride, tetrahydrophthalic anhydride, methyl-hexahydrophthalic anhydride, methyltetrahydrophthalic anhydride, methylnadic anhydride, dodecenylsuccinic anhydride, pyromellitic anhydride and the like; amines such as triethylenetetramine, metaphenylenediamine, tris(dimethylaminomethyl)phenol and the like; dicyandiamide; boron trifluoride-amine complex; imidazole; etc. One or a mixture of two or more compounds selected from the group consisting of these compounds may be used. The curing agent is formulated in an amount generally within the range of from 2 to 150% by weight based on the epoxy resin.

The cut fibers of the component (C) to be used in this invention are fibers, having distributions in diameters generally of 3 to 20 μm, preferably of 9 to 13 μm, and in lengths generally of 3 to 1500 μm, preferably 10 to 1000 μm. If the diameters and lengths fall outside of the above ranges, no lowering of viscosity is observed.

Figure 1:
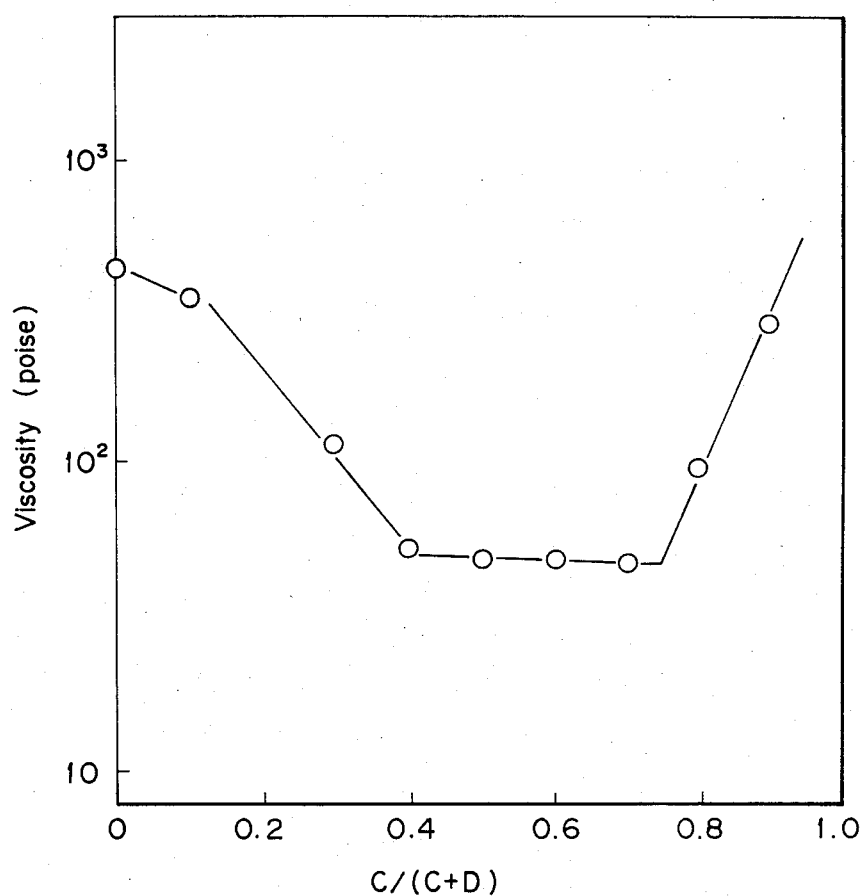
FIG. 1 shows how the viscosity is lowered in the epoxy resin composition for cast molding according to this invention.

FIG. 1 shows how the viscosity of the composition is lowered when fibers having specific shapes and powder having specific particle size distributions are added to the epoxy resin. The epoxy resin, fibers and the powder employed are the same as used in Example 1 described below, but the formulated proportions were as follows: 70 parts by volume of bisphenol A type glycidyl ether epoxy resin, 30 parts by volume of the alicyclic epoxy resin, and the total amount of the glass fibers having 13 μm in diameter and 50 to 60 μm in mean length and the silica having a mean particle size of 2.4 μm (defined as (C) and (D), respectively) which was made constantly (C)+(D)=117 parts by volume. As can be seen from FIG. 1, the viscosity is increased when fibers or silicas are employed alone, but the viscosity is abruptly lowered when both are employed and becomes minimum in the following range:

$$\frac{(C)}{(C) + (D)} = 0.4 - 0.7$$

As the cut fibers to be used in this invention, there may be employed any of those employed for improvement of mechanical strength, etc. of resins, including, for example, Milled Fiber (trade mark, produced by Asahi Fiber Glass Co.), Microglass Safestrand (trade mark, produced by Nippon Itagarasu Co.), Glasscut Fiber (trade mark, produced by Fuji Fiber Glass Co.), alumina fiber, boron fiber, silicon carbide fiber, metal whiskers, carbon fibers, and others.

The inorganic powder of the component (D) to be used in this invention is powder having a particle size distribution (integrated distribution) of 90% by weight or more of particles with particle sizes of 10 μm or less and 50% by weight of particles with particle sizes of 5 μm or less.

In this invention, in addition to the inorganic powder of the component (D), it is also possible to formulate inorganic powder (E) having a particle size distribution (integrated distribution) of 90% by weight or more of the particles with particle sizes of 50 μm or less and 10% by weight or more of the particles with particle sizes of 10 μm or more. When inorganic powders with different particle size distributions are employed, the effect of lowering in viscosity can be obtained when used in combination with the fibers.

Such inorganic powder may be any of known inorganic powder, as exemplified by silica, alumina, talc, calcium carbonate, clay, aluminum hydroxide, barium sulfate, titanium dioxide, etc.

The amount of the fibers (C) and the powder (D) as described above may be used in an amount of (C)+(D)=40-225 parts by volume, preferably 60 to 100 parts by volume, per 100 parts by volume of the total amount of the resin and the curing agent. If the amount of the fibers and powder is less than the lower limit of the above range, the effect of addition is undesirably very weak with respect to shrinkage, crack resistance and strength. On the other hand, in the range exceeding the upper limit, the viscosity becomes too high to be suitable as a material for cast molding. Further, as to the mixing ratio of the fibers and powder, as shown in FIG. 1, it is preferred to satisfy the following relationship in order to give an ideal mixing ratio in view of workability:

$$\frac{(C)}{(C) + (D)} = 0.3 - 0.8$$

whereby the composition can be minimum in viscosity. However, the ratio of (C)/[(C)+(D)] should be determined also with considerations about strength, crack resistance, shrinkage and cost, in addition to the viscosity of the composition.

If the component (E) is added to the composition, the amounts of the components (C)-(E) formulated may be 40 parts by volume $\leq$(C)+(D)+(E)$\leq$225 parts by volume, and 10 parts by volume $\leq$(E)$\leq$75 parts by volume. If the amount of (C+D+E) are less than 40 parts by weight, the viscosity of the composition is so weak that the fillers will be sedimented to make the composition unsuitable for cast molding material. On the contrary, if the amount of (C+D+E) exceeds 225 parts by volume, the viscosity of the composition becomes so high that the casting working can be performed with marked difficulty. Also, if the amount of the component (E) is less than 10 parts by volume, the effect of lowering viscosity by addition of this component is very weak, while the amount in excess of 75 parts by weight is unsuitable, because it will make the viscosity too high and at the same time lower the characteristics such as crack resistance, etc. The ratio of the components (C) to (E) should ideally correspond to that at approximately the center of the isoviscosity contour (FIG. 2) as shown in Reference example below. However, it should generally be determined also with considerations about strength, crack resistance, shrinkage, cost, etc., in addition to the viscosity of the composition.

The epoxy resin composition for cast molding of this invention can also contain, if desired, additives such as fillers with particle sizes generally employed in the epoxy resin composition for cast molding such as silica, alumina, talc, calcium carbonate, clay, titanium dioxide, etc. [the filler herein mentioned refer to those with particle sizes greater than the component (E)], organic or inorganic colorants, surface treating agents such as silane coupling agents, imidazole type, tertiary amine type or metal complex type curing accelerators, within the range which does not impair the effect of the present invention. For example, there may be employed 2-ethyl-4-methyl-imidazole, 1-benzyl-2-methylimidazole, 2,4,6-tris(dimethylaminomethyl)phenol, benzyldimethylamine, tetradecyldimethylbenzylammonium chloride and the like, which may be used either singly or as a mixture of two or more compounds.

The epoxy resin composition for cast molding of this invention can be prepared according to any of the methods conventionally applied for preparation of resin compositions, which is not particularly limited. An example of such methods comprises charging the starting materials of the components of this invention in predetermined amounts into a universal mixing machine and mixing them under stirring. Then, for the purpose of molding, the resultant composition is sufficiently mixed and degassed, and therafter poured into a mold, followed by curing, for example, at 130° C. for 3 hours and further at 150° C. for 15 hours.

The present invention is described in more detail by referring to the following Examples and Comparative examples.

EXAMPLES 1-4

By use of a bisphenol A type diglycidylether with an epoxy equivalent of 400 (produced by Ciba-Geigy Co.) and an alicyclic epoxy resin with an epoxy equivalent of 156, phthalic anhydride, cut glass fibers (13 $\mu$m in diameter, mean length 50-60 $\mu$m) and two kinds of silica (A: mean particle size 2.4 $\mu$m, B: mean particle size 0.98 $\mu$m), various compositions as indicated in Table 1 were formulated to prepare Examples 1 to 4 of the epoxy resin compositions for cast molding of this invention. Then, after thorough mixing and degassing, the composition was cured at 130° C. for 3 hours, and further at 150° C. for 15 hours to prepare samples for measurement of crack resistance, tensile strength, coefficient of linear expansion and shrinkage. The results are shown in Table 1.

COMPARATIVE EXAMPLES 1-4

Compositions were prepared in the same manner as in Examples 1-4 except for using silica powder (C: mean particle size 12 $\mu$m) as the starting material, and then samples for measurement of various characteristics were prepared. The results are shown in Table 1.

TABLE 1

|  | Unit | Example 1 | Example 2 | Example 3 | Example 4 | Comparative example 1 | Comparative example 2 | Comparative example 3 | Comparative example 4 |
|---|---|---|---|---|---|---|---|---|---|
| Bisphenol A type diglycidyl ether epoxy resin | Parts by volume | 53.8 | 53.8 | 53.8 | 53.8 | 53.8 | 53.8 | 53.8 | 53.8 |
| Alicyclic epoxy resin | Parts by volume | 23.1 | 23.1 | 23.1 | 23.1 | 23.1 | 23.1 | 23.1 | 23.1 |
| Phthalic anhydride | Parts by volume | 23.1 | 23.1 | 23.1 | 23.1 | 23.1 | 23.1 | 23.1 | 23.1 |
| Cut glass fibers | Parts by volume | 71.8 | 71.8 | 89.8 | 89.8 | 71.8 | — | 71.8 | — |
| Silica A (2.4 $\mu$m) | Parts by volume | 17.1 | — | — | — | — | 89.8 | — | — |
| Silica B (0.98 $\mu$m) | Parts by volume | — | 17.1 | 17.1 | 59.7 | — | — | — | — |
| Silica C (12 $\mu$m) | Parts by volume | — | — | — | — | — | — | 17.1 | 89.8 |
| Fluidity (*1) | — | ⊚ | ⊚ | ○ | ⊚ | X | X | X | ○ |
| Crack resistance (*2) | — | 7.0 | 12.4 | 16 | 16 | — | — | — | 0 |
| Tensile strength (*3) | Kg/mm$^2$ | 11.2 | 12.9 | 14.3 | 11.7 | — | — | — | 9.3 |
| Coefficient of linear expansion | $10^{-5}$ mm/mm · °C. | 2.05 | 2.64 | 2.31 | 2.51 | — | — | — | 3.4 |
| Shrinkage | % | 0.15 | 0.15 | 0.12 | 0.13 | — | — | — | 0.59 |

Note:
(*1) measured with eyes;⊚ excellent,○: good, X: unacceptable.
(*2) Orifant washer method (according to Industrial Material, Vol. 29, No. 5, p. 59, 1981).
(*3) according to JIS K6911.

EXAMPLES 5-7

By using as the epoxy resin a bisphenol A type diglycidyl ether epoxy resin (Araldite CT-200 (trade mark), produced by Ciba-Geigy Co.), a bisphenol A type diglycidyl ether epoxy resin with an epoxy equivalent of 184 to 194 (Epikote 828 (trade mark), produced by Shell Chemical Co.) or an alicyclic epoxy resin with an epoxy equivalent of 156 (Araldite CY 175 (trade mark), produced by Ciba-Geigy Co.); as the curing agent, phthalic anhydride or HN 2200 (trade mark, produced by Hitachi Kasei Kogyo Co.); as the curing accelerator, N,N-dimethylbenzylamine (BDMA); as the cut fibers, glass fibers with a diameter of 13 $\mu$m and a mean length of 50 to 60 $\mu$m (produced by Nippon Itagarasu Co.); as the inorganic powder, two kinds of silica powder (produced by Tatsumori Co.) having a mean particle size of about 1 $\mu$m (99% by weight of particles with particle sizes of 5 $\mu$m or less) and a mean particle size of about 12 $\mu$m (60% by weight of particles with particle sizes of 10 $\mu$m or more), the respective compositions as indicated in Table 2 were formulated to prepare Examples 5 to 7 of the epoxy resin composition for cast molding of the present invention. Then, after thorough mixing and degassing, curing was effected at 130° C. for 3 hours, and further at 150° C. for 15 hours, to prepare test strips.

COMPARATIVE EXAMPLES 5–11

On the other hand, as Comparative examples 5 to 10, the same test strips were prepared except for using each one of glass fibers and two kinds or silicas or omitting either one of them. Further, as Comparative example 11, the fillers in amounts of 240 parts by volume were formulated per 100 parts by volume of the resin and the curing agent to prepare a resin composition. However, this composition was too viscous to be cast molded.

For the test strips prepared according to the above methods, fluidity, crack resistance, tensile strength, shrinkage and coefficient of linear expansion were measured. The results are also listed in Table 2.

composition, being also good in fluidity, and therefore its commercial value is very great. Further, when cut fibers of specific shapes and two kinds of inorganic powder having specific particle size distributions are employed, the composition can be lowered dramatically in its viscosity and therefore fibrous fillers can be formulated in large amounts. Accordingly, without damaging cast molding workability at all, marked improvement of characteristics of the cured product such as crack resistance, strength and low shrinkage is rendered possible and therefore its commercial value as the resin composition for cast molding is very great.

We claim:
1. An epoxy resin composition for cast molding comprising:
   (A) an epoxy resin;
   (B) a curing agent;

TABLE 2

|  |  | Unit | Example 5 | Example 6 | Example 7 | Comparative example 5 | 6 | 7 | 8 | 9 | 10 | 11 |
|---|---|---|---|---|---|---|---|---|---|---|---|---|
| Resin | Araldite CT-200 | Parts by volume | 57.1 | 57.1 | — | 57.1 | 57.1 | 57.1 | 57.1 | 57.1 | 57.1 | — |
|  | Epikote 828 | Parts by volume | — | — | 55.4 | — | — | — | — | — | — | 55.4 |
|  | Araldite CY-175 | Parts by volume | 14.3 | 14.3 | — | 14.3 | 14.3 | 14.3 | 14.3 | 14.3 | 14.3 | — |
| Curing agent | Phthalic anhydride (HT-903) | Parts by volume | 28.6 | 28.6 | — | 28.6 | 28.6 | 28.6 | 28.6 | 28.6 | 28.6 | — |
|  | HN 2200 | Parts by volume | — | — | 44.3 | — | — | — | — | — | — | 44.3 |
| Accelerator | BDMA | Parts by volume | — | — | 0.3 | — | — | — | — | — | — | 0.3 |
| Filler | Cut glass fibers (C) | Parts by volume | 33 | 50 | 70 | — | — | 100 | — | 75 | 75 | 80 |
|  | Silica (D) | Parts by volume | 33 | 50 | 70 | — | 100 | — | 75 | — | 75 | 80 |
|  | Silica (E) | Parts by volume | 33 | 50 | 70 | 100 | — | — | 75 | 75 | — | 80 |
| (C) + (D) + (E) |  | Parts by volume | 100 | 150 | 210 | 100 | 100 | 100 | 150 | 150 | 150 | 240 |
| Fluidity (*1) |  | — | ◉ | ◯ | ◯ | ◯ | X | X | X | X | Δ | X |
| Crack resistance (*2) |  | — | >10 | >10 | >10 | 1.2 | — | — | — | — | >10 | — |
| Tensile strength (*3) |  | Kg/mm² | 11.0 | 12.1 | 13.8 | 8.7 | — | — | — | — | 12.0 | — |
| Coefficient of linear expansion |  | $10^{-5}$ mm/mm · °C. | 2.7 | 2.5 | 2.2 | 3.5 | — | — | — | — | — | — |
| Shrinkage |  | % | 0.31 | 0.15 | 0.23 | -0.52 | — | — | — | — | — | — |

Note:
(*1) ocular determination ◉: excellent, ◯: good, Δ: bad, X: unacceptable.
(*2) Orifant washer method (according to Industrial Material, Vol. 29, No. 5, p. 59, 1981).
(*3) according to JIS K6911.

REFERENCE EXAMPLE

By use of the same resins and the fillers (C)–(E) as employed in Example 5, the proportions of the three kinds of fillers were varied variously, and from the results of measurement of the viscosities of the compositions obtained, a ternary system isoviscosity contour was drawn. For avoiding viscosity elevation during measurement, no curing agent was added. Viscosity was determined by a B-type viscometer (produced by Tokyo Keiki Co.) by heating the resin composition to 140° C.

Figure 2:
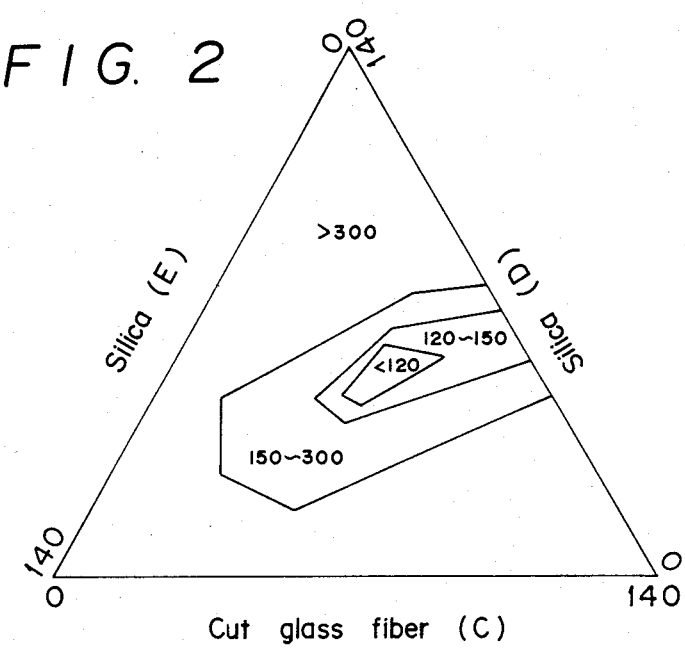
FIG. 2 draws an isoviscosity contour when 100 parts by volume of a resin are formulated with cut fibers (C) and silicas (D) and (E), in amounts within the ranges of from 0 to 140 parts by volume, respectively, the values in the Figure showing viscosities (poise)
Figure 3:
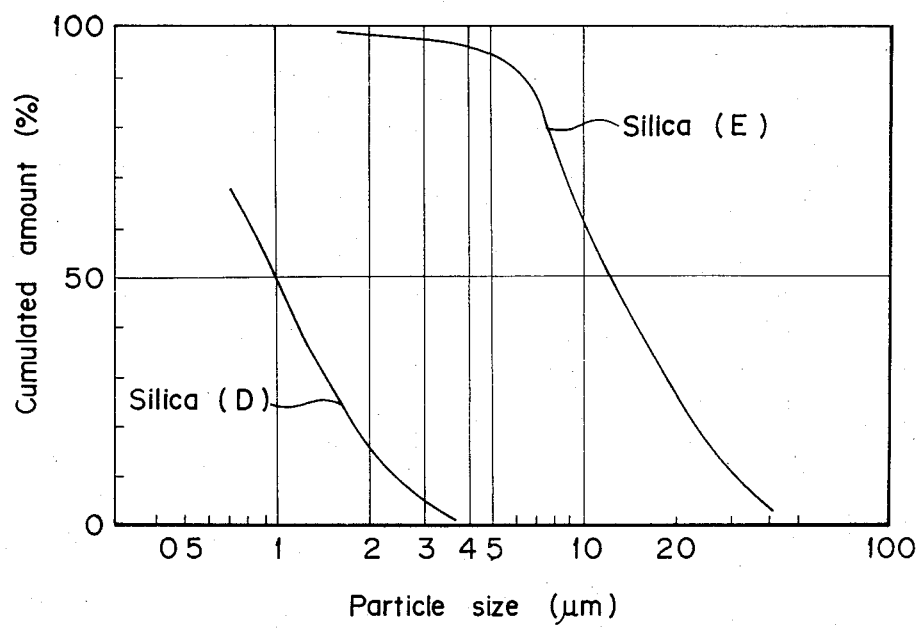
FIG. 3 shows particle size distributions of two kinds of silica powder (D) and (E) employed in Examples of this invention.

As apparently seen from FIG. 2, the viscosity of the composition becomes minimum at approximately the center region in the chart, and the viscosity is increased as departed farther from said region. Therefore, it can be seen that, in aspect of workability, the viscosity should preferably be made that of the center region where the viscosity is the lowest.

As described in detail above, the epoxy resin composition for cast molding is excellent in crack resistance, strength as well as low shrinkage characteristic of the (C) cut fibers which are 3 to 20 μm in diameter and 3 to 1500 μm in length;
(D) inorganic powder comprised of particles such that 90% by weight or more of the particles have particle sizes of 10 μm or less and 50% by weight or more of the particles have particle sizes of 5 μm or less,
the total amount of the components (C) and (D) formulated being 40 to 225 parts by volume per 100 parts by volume of the total amount of the components (A) and (B) formulated, such that said resin composition has a viscosity which is sufficiently low to be suitable for cast molding.

2. An epoxy resin composition for cast molding according to claim 1, wherein the curing agent is formulated in an amount of 2 to 150% by weight based on the epoxy resin.

3. An epoxy resin composition for cast molding according to claim 1, wherein the cut fibers have distributions of 9 to 13 μm in diameter and 10 to 1000 μm in length.

4. An epoxy resin composition according to claim 1, wherein the total amount of the components (C) and (D) formulated is 60 to 100 parts by volume per 100 parts by volume of the total amount of the components (A) and (B) formulated.

5. An epoxy resin composition for cast molding according to claim 1, wherein the formulation ratios of the cut fibers (C) and the inorganic powder (D) satisfy the following relationship in terms of volume ratio:

$$\frac{(C)}{(C) + (D)} = 0.3 - 0.8$$

6. An epoxy resin composition for cast molding according to claim 1, further containing (E) inorganic powder having size distribution of particles with 90% by weight or more of particles with sizes of 50 μm or less and more than 10% by weight of particles with sizes of 10 μm or more, said inorganic powder (E) being contained in an amount satisfying the following ranges per 100 parts by volume of the total amount of the components (A) and (B) formulated:

40 parts by volume $\leqq$(C)+(D)+(E)$\leqq$225 parts by volume; and 10 parts by volume $\leqq$(E)$\leqq$75 parts by volume.

7. An epoxy resin composition for cast molding according to claim 6, wherein the inorganic powder of the component (E) contains 50% by weight or more of particles with sizes exceeding 5 μm.

8. An epoxy resin composition for cast molding according to claim 1, wherein said composition, before said curing agent (D) is formulated, has a viscosity at 150° C. which is no greater than about 120 poise.

9. An epoxy resin composition for cast molding according to claim 1, wherein the cut fibers are present in an amount ranging between about 13.0% and 65.9% based on the total amount of components (A), (B), (C) and (D).

* * * * *